United States Patent [19]

Boni

[11] Patent Number: 5,229,497
[45] Date of Patent: Jul. 20, 1993

[54] PROCESS FOR RECOVERING COLLAGEN

[75] Inventor: Kenneth A. Boni, Columbia, S.C.

[73] Assignee: Teepak, Inc., Westchester, Ill.

[21] Appl. No.: 592,149

[22] Filed: Oct. 3, 1990

[51] Int. Cl.$^5$ .................. A22C 13/00; C08L 89/00; C07K 3/02; C07K 15/06

[52] U.S. Cl. .................. 530/356; 530/424; 530/426; 530/427; 426/657; 426/140

[58] Field of Search ............ 530/356, 424, 426, 427; 426/140, 657

[56] References Cited

U.S. PATENT DOCUMENTS

| | | | |
|---|---|---|---|
| 2,114,220 | 4/1938 | Freudenberg | 176/99 |
| 2,919,999 | 1/1960 | Reissmunn et al. | 530/356 |
| 3,123,653 | 3/1964 | Lieberman | 264/99 |
| 3,346,402 | 10/1967 | Lieberman | 99/176 |
| 3,425,847 | 2/1969 | Talty | 99/176 |
| 3,535,125 | 10/1970 | Fagan | 99/176 |
| 4,407,829 | 10/1983 | Sjölander | 426/59 |
| 4,626,286 | 12/1986 | Lubbs | 106/157 |

FOREIGN PATENT DOCUMENTS

| | | | |
|---|---|---|---|
| 609352 | 11/1960 | Canada | 106/124 |
| 0057540 | 11/1982 | European Pat. Off. | |
| 111151 | 2/1974 | Fed. Rep. of Germany | |
| 45-27378 | 9/1970 | Japan | |
| WO89/11799 | 12/1989 | PCT Int'l Appl. | |
| 978614 | 12/1964 | United Kingdom | |

*Primary Examiner*—Jeffrey E. Russel
*Assistant Examiner*—P. Lynn Touzeau
*Attorney, Agent, or Firm*—Michael L. Dunn; James F. Mudd

[57] ABSTRACT

Casings for food such as sausage are prepared from connective tissue that has been removed from animal tissue in accordance with the process comprising the steps of (1) mechanically separating connective tissue and impurities from animal tissue; (2) treating the connective tissue to remove the fat; (3) reducing the residual bone content of the connective tissue by exposure to acidic materials; (4) separation of the non-collagenous protein and elastin by treating the connective tissue with a first enzyme; and (5) separation of the muscle tissue from the connective tissue by treating with a second enzyme. The step of removing the fat from the connective tissue can be accomplished by one or more of the following steps: (A) hydrocarbon extraction of the fat from the connective tissue; (B) extraction of the connective tissue with a critical fluid; (C) dissolution of the fat with a third enzyme; (D) treatment of the fat with a suitable treating agent; (E) heat treatment; and/or (F) pressure treatment e.g., squeezing by application of force.

54 Claims, No Drawings

PROCESS FOR RECOVERING COLLAGEN

BACKGROUND OF THE INVENTION

This invention is in the field of food casings, in particular, edible casings made from collagen, and particularly such casings made for use with sausage.

While various types of collagen have been evaluated in the prior art for edible casing production, none have been successful in replacing the corium layer from bovine hides.

Thus U.S. Pat. No. 3,346,402 discloses the use of bovine tendon as a source of collagen, but has the deficiency that 5 to 20% gelatin must be added. The patent also states that treating tendon collagen with enzyme is not an alternative to adding gelatin because the collagen has inappropriate shrink characteristics when used in casing for fresh sausage.

U.S. Pat. No. 4,626,286 discloses the use of clean tendons to obtain collagen for manufacture of thin collagen film articles having superior mechanical properties. Cleaned tendons are ground and exposed to enzymes. Such a system of course has the disadvantage of requiring a specific tendon (bovine digital flexor) that is free of ligamentous tissue. This tendon is not available in sufficient quantity to meet the needs of sausage casing manufacture.

U.S. Pat. No. 4,407,829 discloses recovery of collagen from organs of the digestive system and other slaughter products of an animal, such as the lungs, udders etc. The patent does not disclose the use of connective tissue such as tendon, ligament and cartilage as suitable sources of collagen. While the patent mentions casings for food products as an objective, the example and claims do not disclose or recite manufacture of casing.

The current source of collagen for the preparation of food casings, such as sausage casings, is therefore the corium layer split from bovine hides. The market price for this material is generally tied to the price of the hides. Declining beef production coupled with increasing world demand for leather from hides has greatly increased the price for hides. Thus, there is a need for a lower cost source of collagen.

It is a purpose of this invention to develop a lower cost source of collagen for use in food casing compared to the corium layer from bovine hides.

It is a further purpose of this invention to provide a process for separating collagen from beef shanks and other animal parts which does not denature the collagen.

It is a further purpose of this invention to provide a method for preparing collagen casings by which the disadvantages of the prior art processes are avoided.

Still another purpose of this invention is to accomplish the forgoing purposes while providing an edible collagen casing.

BRIEF DESCRIPTION OF THE INVENTION

In accordance with the present invention, a lower cost source of collagen is provided for use in food casing, from impure connective tissue obtained as a by-product of separating meat from animal tissue. As used herein, animal tissue comprises connective tissue, fat and meat (muscle tissue or flesh), but excludes skin and bones. As used herein, connective tissue means those tissues that are high in collagen found throughout the animal body serving to bind together and support other tissues and organs including the skeleton. Examples of this connective tissue are tendon, ligament, blood vessels, cartilage and muscle sheath, but excluding organs of the digestive system and other slaughter products of an animal, such as the lungs, udders etc. Impurities in the by-product of separating meat from animal tissue are fat, bone chips, meat (muscle tissue or flesh), and other non-collagenous proteins such as proteoglycans and elastin. Elastin is a component of blood vessels and cartilage.

In accordance with the invention, a process is provided for recovering collagen from animal tissue comprising connective tissue and meat, for use in food casing, comprising separating the connective tissue from the meat without denaturing the collagen. The separation process should not denature or breakdown the collagen to a form that is unsuitable for casing manufacture.

The invention further provides a process for recovering from animal tissue, a collagen containing material which is suitable for the production of edible sausage casings. The preferred process comprises mechanically separating connective tissue and impurities e.g., by product, from the meat in animal tissue. Shanks from beef cattle after removing the skin and bone are typical animal tissue. Beef cattle tendon, ligament, cartilage and muscle sheath are typical connective tissues.

The mechanical separation step is preferably followed by one or more of the following steps for removing impurities from the connective tissue or by-product:

(1) removing fat from the by-product;

(2) reducing the residual bone content of the by-product;

(3) separation of non-collagenous proteins such as elastin, from the by-product; and (4) separation of meat (flesh and muscle tissue) from the by-product.

In the forgoing process, the step of removing the fat from the by-product can be accomplished by one of several processes, alone or in combination, including:

(A) extraction of the fat from the by-product with organic solvents;

(B) extraction of the fat from the by-product with critical fluid technology using materials such as carbon dioxide and propane;

(C) dissolution of the fat with an enzyme such as lipase;

(D) saponification and dissolution of the fat with suitable saponifying solutions;

(E) heat treatment;

(F) pressure treatment.

Bone may be removed by several processes such as mechanical removal or acidification.

Non-collagenous protein, elastin and muscle tissue may be removed by any suitable method such as treatment with one or more enzymes.

DETAILED DESCRIPTION OF THE INVENTION

In accordance with the present invention, animal tissue such as shanks from beef cattle, can be the source of the collagen for use in the manufacture of food casings, especially casings for sausage, and more particularly, edible casings for food, including sausage. Other suitable sources of collagen include connective tissue from other animals such as poultry, sheep and swine.

Separation of the connective tissue or by-product from the animal tissue is advantageously carried out with a desinewing machine such as manufactured by the Baader Corporation. In the process of this invention, the meat and connective tissue are subjected to a temperature rise of less than about 2° C. in passing through the desinewing machine. This low temperature rise is important to avoid denaturing (or breakdown) of the collagen to a form that is unsuitable for casing manufacture. This machine has a hard but flexible rubber belt that presses animal tissue through perforated holes in a rotating drum. Pressure that is developed between the rubber belt and drum is applied over a short interval of the belt to minimize heat build up. Belt speed is matched to the surface speed of the drum at the point of maximum pressure to avoid shear or smearing of the meat product. Soft material or meat and including muscle and fat that is extruded into the drum is removed from the inside of the drum with an auger, while the harder connective tissue is removed from the outer surface of the drum with a doctor blade.

By contrast, prior art machines force material through holes in a stationary drum, which causes high shear and a temperature rise in the meat product and the by-product that discolors the meat and denatures the collagen.

The by-product of the desinewing step includes sinew which comprises tendon, ligament, blood vessels, cartilage and muscle sheath combined with one or more "impurities" such as fat, bone, meat, non-collagenous proteins such as elastin.

Following is a typical composition of the by-product from the desinewing of beef shank with the Baader machine.

Water 45–55 percent
Fat 17.5–25 percent
Ash 0.4–0.6 percent
Collagen and 19.4–37.1 percent
Elastin The following are details of the preferred steps for removing the impurities from the by-product of separating meat from animal tissue:

(1) The step of removing the fat from the by-product can be accomplished by one or more of the following steps:

(A) Extraction of the fat from the by-product can be accomplished by treating the by-product with a liquid hydrocarbon such as hexane. Other non polar liquids such as hydrocarbons of five to about 10 carbon atoms, such as pentane, hexane, heptane, octane and decane can be used, as well as alcohols, ketones and ethers of two to five carbon atoms such as ethanol, propanol, butanol or pentanol, acetone, methyl ethyl ketone or diethyl ether, can be employed in this extraction step.

(B) The fat can also be removed from the by-product by extraction of the by-product with fluids such as a hydrocarbon or carbon dioxide in the critical state. In this process, the by-product is preferably mixed with propane at high pressures, the fat solution is separated from the by-product, and the pressure is reduced to separate the fat from the propane.

(C) The fat can also be removed from the by-product by the step of dissolution with a first enzyme such as lipase.

(D) The fat can be removed from the by-product by saponification and dissolution, which involves a treatment of the by-product with suitable saponifying agents in solution such as alkali metal hydroxides, for example, sodium hydroxide and potassium hydroxide. Alkaline earth metal hydroxides such as calcium or magnesium hydroxides are also useful for this purpose.

(E) The fat can also be removed by heat treatment, such as in a heated oven; although this is not preferred because of potential heat rise of the collagen.

(F) Fat removal can be achieved by the application of force to squeeze out the fat from the by-product.

It is desirable to reduce the fat content of the by-product from its usual level of about 50 weight percent of the solids to less than about 5 weight percent of the solids.

Treatment with sodium hydroxide is the preferred method for fat removal because this procedure simultaneously removes noncollagenous proteins and partially deamidates the collagen. Deamidation is desired but not required to control isoelectric pH, and to control "swell" during casing preparation.

(2) After removing the fat from the impure connective tissue by one or more of the forgoing steps, the by-product is further treated by exposure to an acidic compound. This step is believed to involve dissolution and extraction of residual bone content of the connective tissue. Suitable acidic materials include sodium citrate, citric acid buffer, as well as other acidic materials such as hydrochloric acid, acetic acid, carbonic acid, formic acid or other weak, organic acids. The preferred acidic materials are those based on citric acid. Alternatively, the residual bone content can be removed by mechanical means such as by filtration or flotation.

It is desirable to reduce the bone content of the connective tissue from its usual level of about 2 percent of solids (ash) to less than about 0.5% of solids.

(3) Reduction of the residual non-collagenous protein such as elastin, may be accomplished by treatment of the connective tissue or by-product with a second enzyme compound. Suitable enzyme compounds include Rhozyme 41, which is a proteolytic enzyme derived from Aspergillus oryzae and manufactured by Genencor; and NUE 6.0, which is an alkali stable proteolytic proteinase, manufactured by Nova. Alternatively this step can be accomplished by treatment of the by-product with an alkali-metal hydroxide such as sodium hydroxide or with an alkaline earth metal hydroxide such as calcium hydroxide.

(4) The step of separation of residual meat (flesh or muscle tissue) from the connective tissue or by-product is accomplished by exposure of the connective tissue to a third enzyme. Suitable such enzymes include the following: HT Proteolytic, a tradename for an enzyme that is obtained from Bacillus subtilin by Miles. Also useful are papein or acid protease, an enzyme obtained from Aspergillus niger, (manufactured by Biocon). The same enzyme can be used in steps 3) and 4).

The purified by-product is employed to make casing by any of the processes known in the art such as described in U.S. Pat. Nos. 2,114,220; 3,123,653; 3,425,847 and 3,535,125, and Japanese Patent Publication No. SHO 45-27378 (Nippi), the disclosures of which are incorporated herein by reference.

The following specific example serves to illustrate and not limit the present invention. Unless otherwise indicated in this specification and claims, all parts and percentages are by weight, and all temperatures are in degrees Celsius.

Example 1

By-product from desinewing beef shanks with a Baader Desinewing Machine 699S was the starting material. The material was passed through the Baader machine twice to maximize the separation of the lean meat from the remainder of the material in the shank but in a manner to insure minimum heat build up (<2° C.) in the meat and the by-product.

Treatment of the by-product with sodium hydroxide (NaOH) was used to reduce the fat content, reduce concentration of non-collagenous proteins, and to induce deamidation. A 20 pound sample of the by-product was placed in a Canbar polyethylene lab drum (4.0 ft diameter × 2.0 ft long) along with 50 pounds of water at 35° C. and the pH was adjusted to 12.9 with 5% NaOH, and 27 grams of Borron TS (Rohm Tech, Inc.'s non-ionic surfactant). After 2 hours of rotation of the lab drum at 3 RPM, an additional 40 pounds of water at 40° C. was added. After adjusting the pH to 12.7, 27 grams of Borron TS (Rohm Tech, Inc.'s nonionic surfactant) was added. After 2 more hours of rotation, the float was drained off, fresh water added, the mixture was brought to a pH of 12.7, and 30 grams of Borron TS were added. This sequence was repeated 5 more times. The sample was then washed for 60 minutes with a 5 GPM flow of water through the Canbar lab drum which was rotated at 10 RPM. Elapsed time from first exposure to sodium hydroxide to completion of the washing step was 22 hours.

The pH of the NaOH treated material was dropped and residual bone fragments reduced by adding $NH_4Cl$, followed by HCl. About 40 pounds of water was added to the sample in the Canbar lab drum followed by 3.4 pounds of $NH_4Cl$ to the system which includes 75 pounds of water in a recirculation system external to the Canbar lab drum. After 15 minutes of rotation, the pH was at 7.2. Dilute HCl (18%) was dripped into the recirculation system at a rate sufficient to maintain a pH of 5.3 in the recirculation system over a period of 4.5 hours which brought the pH of the liquid in the drum to 5.75. The material was then washed with water at 6 GPM with the drum rotating at 10 RPM for 30 minutes. The residue from bone fragments as measured by the ash content was approximately 0.25%.

A collagen fiber dispersion was prepared from the partially purified material by particle reduction followed by dilution, acidification, and homogenization. A Comitrol (Model No. 2100) centrifugal cutting device manufactured by Urschel, with a 3-K-030-120 head, was used for particle reduction. Blending, dilution, and acidification were carried out in a 2 gallon Ross Double Planetary Mixer. Dilution was to 5.35% non-volatiles. A mixture of HCl and lactic acid at a 5.6 mole ratio was used for acidification to a pH of 2.4. The residual particulate material was broken down by two passes through a 100 GPH 2-stage Manton-Gaulin Homogenizer with a total pressure drop of 2,000 psi. After 3 days of aging at about 5° C., the "slurry" of collagen was formed into an edible sausage casing suitable for beef sticks by the "wet" process well known to those skilled in the art, e.g. U.S. Pat. No. 3,425,847.

Thermal properties of the casing produced from the purified desinewing by-product were compared with those from casing produced from the corium layer of bovine hides, by DSC analysis and by an isometric shrink test. The DSC curves for both samples had a broad peak with maximum at a temperature of about 88° C. and a sharp peak with maximum at about 142° C. The low temperature peak began at about 40° C. and returned to the baseline at about 130° C. In both thermograms, the large peak contained 93% of the area.

The isometric shrink test measures the force generated by heating a sample at a controlled rate of about 1.5° C./min with the length of the sample fixed. If an Instron is used to constrain the sample length, then a direct read-out of the force can be obtained. The casing prepared from the purified desinewing by-product developed shrink forces in the longitudinal and radial direction consistent with the requirements of a casing intended for beef stick applications.

What is claimed is:

1. A process for recovering collagen, from animal tissue which includes connective tissue and meat, for use in food casing, by mechanically separating connective tissue from animal tissue by pressing the animal tissue with a hard but flexible rubber belt against a rotating drum having perforated holes in the surface thereof, so that the meat passes through said holes into the drum, while the connective tissue is retained on and recovered from the outer surface of the drum.

2. The process of claim 1, wherein the animal tissue is from cattle.

3. The process of claim 1, wherein the animal tissue is from poultry.

4. The process of claim 1, wherein the animal tissue is from swine.

5. The process of claim 1, wherein the animal tissue is from sheep.

6. The process of claim 1, wherein the animal tissue is animal leg material.

7. The process of claim 6, wherein the animal leg material is beef cattle shank that has been skinned and deboned.

8. A process for recovering collagen from animal tissue which includes connective tissue and meat, for use in collagen film, by mechanically separating connective tissue from animal tissue by pressing the animal tissue with a hard but flexible rubber belt against a rotating drum having perforated holes in the surface thereof, so that the meat passes through said holes into the drum, while the connective tissue is retained on and recovered from the outer surface of the drum.

9. The process of claim 8, wherein the animal tissue is from cattle.

10. The process of claim 8, wherein the animal tissue is from poultry.

11. The -process of claim 8, wherein the animal tissue is from swine.

12. The process of claim 8, wherein the animal tissue is from sheep.

13. The process of claim 8, wherein the animal tissue is animal leg material.

14. The process of claim 13, wherein the animal leg material is beef cattle shank that has been skinned and deboned.

15. A process for recovering collagen, from animal tissue which includes connective tissue and meat, for use in food casing, comprising (1) mechanically separating connective tissue from the animal tissue by pressing the animal tissue with a hard but flexible belt against a rotating drum having perforated holes in the surface thereof, so that the meat passes through said holes into the drum, while the connective tissue is retained on and recovered from the outer surface of the drum; followed by (2) treating the connective tissue to remove fat.

16. The process of claim 15, wherein step (2) is followed by one or more of the following steps:
   (3) reducing the residual bone content of the connective tissue by treating the connective tissue with an acidic material;
   (4) separation of non-collagenous protein from the connective tissue by treating the connective tissue with a first enzyme; and
   (5) separation of the meat from the connective tissue by treating the connective tissue with a second enzymes; and recovering collagen as a product of the process.

17. The process of claim 16, wherein step (3) is employed.

18. The process of claim 16, wherein steps (3) and (4) are employed.

19. The process of claim 16, wherein steps (3) and (5) are employed.

20. The process of claim 16, wherein steps (4) and 5) are employed.

21. The process of claim 20, wherein the first and second enzymes are the same.

22. The process of claim 16, wherein steps (3), (4) and (5) are employed.

23. The process of claim 15, wherein step (2) is carried out by extraction of the fat from the connective tissue by a liquid hydrocarbon, alcohol, ketone or ether.

24. The process of claim 15, wherein step (2) is carried out by extraction of the connective tissue with a critical fluid.

25. The process of claim 15, wherein step (2) is carried out by dissolution of the fat with a first enzyme.

26. The process of claim 15, wherein step (2) is carried out by saponification and dissolution of the connective tissue with a saponifying agent.

27. The process of claim 15, wherein step (2) is carried out by heat treatment of the connective tissue.

28. The process of claim 15, wherein step (2) is carried out by applying force to the connective tissue to squeeze out the fat.

29. The process of claim 15, wherein the animal tissue is from cattle.

30. The process of claim 15, wherein the animal tissue is from poultry.

31. The process of claim 15, wherein the animal tissue is from swine.

32. The process of claim 15, wherein the animal tissue is from sheep.

33. The process of claim 15, wherein the animal tissue is animal leg material.

34. The process of claim 33, wherein the animal leg material is beef cattle shank that has been skinned and deboned.

35. A process for recovering collagen, from animal tissue which includes connective tissue and meat, for use in collagen film, comprising (1) mechanically separating connective tissue from the animal tissue by pressing the animal tissue with a hard but flexible belt against a rotating drum having perforated holes in the surface thereof, so that the meat passes through said holes into the drum, while the connective tissue is retained on said recovered from the outer surface of the drum; followed by (2) treating the connective tissue to remove fat.

36. The process of claim 35, wherein step (2) is followed by one or more of the following steps:
   (3) reducing the residual bone content of the connective tissue by treating the connective tissue with an acidic material;
   (4) separation of non-collagenous protein from the connective tissue by treating the connective tissue with a first enzyme; and
   (5) separation of the meat from the connective tissue by treating the connective tissue with a second enzyme; and recovering collagen as a product of the process.

37. The process of claim 35, wherein step (3) is employed.

38. The process of claim 35, wherein steps (3) and (4) are employed.

39. The process of claim 35, wherein steps (3) and (5) are employed.

40. The process of claim 35, wherein steps (4) and (5) are employed.

41. The process of claim 40, wherein the first and second enzymes are the same.

42. The process of claim 35, wherein steps (3), (4) and (5) are employed.

43. The process of claim 35, wherein step (2) is carried out by extraction of the fat from the connective tissue by a liquid hydrocarbon, alcohol, ketone or ether.

44. The process of claim 35, wherein step (2) is carried out by extraction of the connective tissue with a critical fluid.

45. The process of claim 35, wherein step (2) is carried out by dissolution of the fat with a first enzyme.

46. The process of claim 35, wherein step (2) is carried out by saponification and dissolution of the connective tissue with a saponifying agent.

47. The process of claim 35, wherein step (2) is carried out by heat treatment of the connective tissue.

48. The process of claim 35, wherein step (2) is carried out by applying force to the connective tissue to squeeze out the fat.

49. The process of claim 35, wherein the animal tissue is from cattle.

50. The process of claim 35, wherein the animal tissue is from poultry.

51. The process of claim 35, wherein the animal tissue is from swine.

52. The process of claim 35, wherein the animal tissue is from sheep.

53. The process of claim 35, wherein the animal tissue is animal leg material.

54. The process of claim 53, wherein the animal leg material is beef cattle shank that has been skinned and deboned.

* * * * *